United States Patent
Rantala et al.

(10) Patent No.: US 6,547,000 B1
(45) Date of Patent: Apr. 15, 2003

(54) HEAT EXCHANGE FOR A FILM HEAT EXCHANGER AND A METHOD FOR MANUFACTURING THE SAME

(75) Inventors: Reijo Rantala, deceased, late of Laitila (FI), by Virpi Rantala, Merita Rantala, heirs; by Marko Rantala, heir, Lappeenrantha (FI); Leif Ramm-Schmidt, Kirkkonummi (FI); Annika Rantala, heir, Laitila (FI), by Virpi Rantala, legal guardian

(73) Assignee: Hadwaco Ltd. Oy, Helsinki (FI)

( * ) Notice: Subject to any disclaimer, the term of this patent is extended or adjusted under 35 U.S.C. 154(b) by 0 days.

(21) Appl. No.: 09/341,855
(22) PCT Filed: Jan. 19, 1998
(86) PCT No.: PCT/FI98/00038
§ 371 (c)(1),
(2), (4) Date: Nov. 28, 2000
(87) PCT Pub. No.: WO98/31529
PCT Pub. Date: Jul. 23, 1998

(30) Foreign Application Priority Data

Jan. 20, 1997 (FI) .................................................. 970227

(51) Int. Cl.[7] ................................................. F28F 3/14
(52) U.S. Cl. ................... 165/170; 165/905; 29/898.039
(58) Field of Search .............................. 165/166, 167, 165/170, 171, 172, 46; 29/890.039, 890.04, 890.041, 890.053

(56) References Cited

U.S. PATENT DOCUMENTS

| | | | | |
|---|---|---|---|---|
| 3,036,369 A | * | 5/1962 | Wilkins | ....................... 165/170 |
| 3,648,768 A | * | 3/1972 | Scholl | ......................... 165/46 |
| 4,017,351 A | | 4/1977 | Larson et al. | |
| 4,111,659 A | | 9/1978 | Bowley | |
| 4,351,797 A | | 9/1982 | Bellhouse et al. | |
| 4,411,310 A | | 10/1983 | Perry et al. | |
| 4,471,759 A | | 9/1984 | Anderson et al. | |
| 4,562,630 A | * | 1/1986 | Larsson | ................. 29/890.039 |
| 4,585,523 A | | 4/1986 | Giddings | |
| 5,411,079 A | * | 5/1995 | Sasaki et al. | ................ 165/171 |
| 5,505,256 A | * | 4/1996 | Boardman et al. | .......... 165/166 |
| 5,634,269 A | | 6/1997 | Lowenstein et al. | |
| 6,050,330 A | * | 4/2000 | Schmit et al. | .......... 29/890.039 |

FOREIGN PATENT DOCUMENTS

| | | |
|---|---|---|
| DE | 1259362 | 1/1968 |
| EP | 1465564 | 2/1977 |
| EP | 0286399 | 10/1988 |
| EP | A2037802 | 10/1989 |
| FI | 79948 | 12/1989 |
| FI | 86961 | 6/1992 |
| FR | 2492312 | 7/1981 |
| WO | 91 04451 | 4/1991 |

\* cited by examiner

*Primary Examiner*—Henry Bennett
*Assistant Examiner*—Terrell McKinnon
(74) *Attorney, Agent, or Firm*—Birch, Stewart, Kolasch & Birch, LLP

(57) ABSTRACT

The invention relates to a heat exchange element (1) for a film heat exchanger intended for distillation or for the evaporation of solutions or suspensions, and to a method for manufacturing the same. The substantially bag-like element is formed by bonding from oppositely positioned plastic heat exchange films (2), evaporation of liquid taking place on the exterior surfaces of the films and condensing of the obtained vapor taking place on the interior surfaces. In the bonding the interior (4) of the element is divided into ducts to direct the travel of the vapor, and according to the invention the films are at the same time stretched in the intervals between the bonding points (3) in order to provide leeway for bulging during the pressurization of the interior of the element. The element (1) may be made up of two heat exchange films (2) stretched by means of heat and a pressure differential between the different sides of the film, the films being bonded directly to each other, or there being bonded, between the heat exchange films to be stretched, one or more straight support films to improve the loadbearing capacity of the element.

18 Claims, 4 Drawing Sheets

Figure 5:
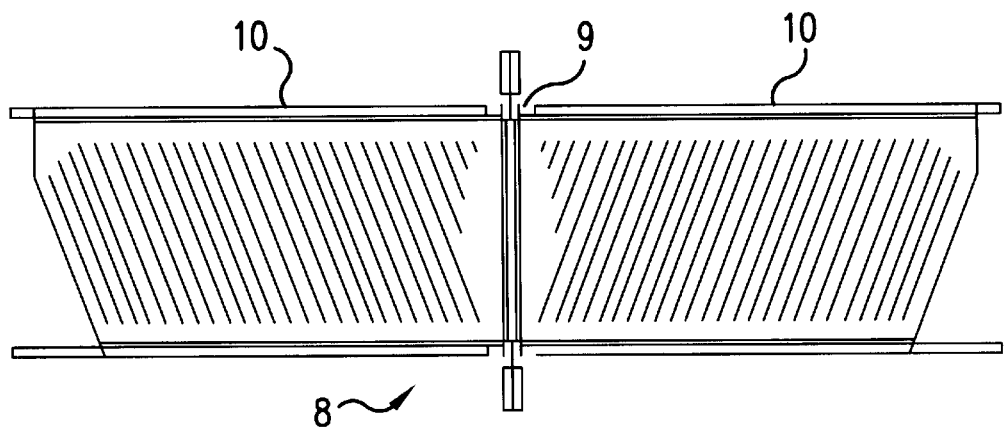

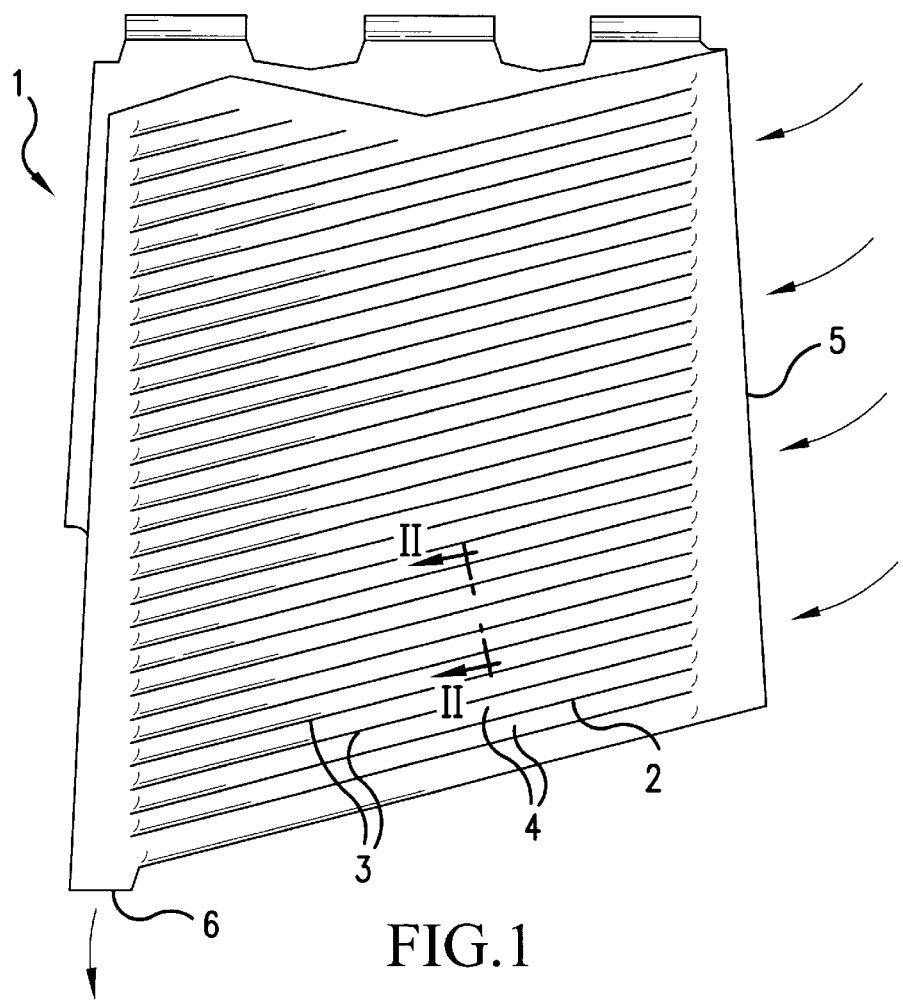
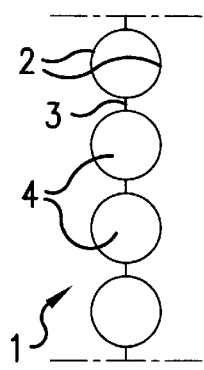 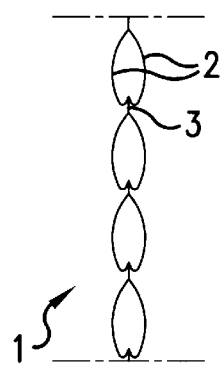 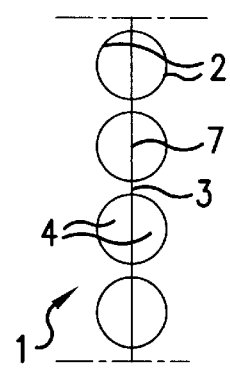
FIG.2  FIG.3  FIG.4

HEAT EXCHANGE FOR A FILM HEAT EXCHANGER AND A METHOD FOR MANUFACTURING THE SAME

This application is the national phase under 35 U.S.C. §371 of PCT International Application No. PCT/FI98/00038 which has an International filing date of Jan. 19, 1999, which designated the United States of America.

The object of the present invention is a method for manufacturing a heat exchange element for a film heat exchanger, wherein the element, intended for a heat exchanger transferring heat from pressurized vapor being condensed inside the elements to a liquid being evaporated on the exterior surfaces of the element, is formed from oppositely positioned plastic films which are bonded to each other at selected points in order to form ducts inside the element. In addition, the invention relates to a heat exchange element which can be manufactured by the said method.

FI lay-open print 86961 describes a film heat exchanger consisting of elements made of plastic film, wherein a liquid is directed to evaporate on the exterior surfaces of oppositely positioned elements, and the forming evaporated vapor is compressed to a higher pressure and temperature by a compressor and is directed to the interior of the elements as a heating vapor, which during the heat exchange is recondensed to liquid. The disclosed heat exchanger is suitable, for example, for the distillation of sea water and for the concentration of various solutions and suspensions.

The oppositely positioned plastic films of heat exchange elements according to FI publication 86961 are bonded to each other by linear welded seams, which divide the interior of the element into zigzagging ducts leading downwardly from the top. The purpose of these ducts is to direct the flow of vapor inside the element and to ensure the distribution of the liquid flowing on the exterior surface of the element over the entire area of the element in order to exploit effectively its heat exchange capacity. Simpler heat exchange elements for a film heat exchanger, bonded by spot welds or short linear welded seams, are additionally known from previous FI lay-open print 79948 and U.S. Pat. No. 4,585,523.

The known heat exchange elements according to the said publications are characterized in that in use they bulge under the effect of the pressurized vapor directed to their interior, whereby the exterior dimensions of the element, i.e. the height and the width of the element, are at the same time reduced. As a consequence of the expansion, there are formed in the plastic films, around the spot-like or linear seams of the element, wrinkles which cause tension peaks in the films. When, during use, a fluttering movement caused by vapor flows appears in the elements, this movement has a fatiguing effect on the films, especially in the areas of the tension peaks, gradually resulting in holes and tears forming in the films. Furthermore, during the movement of the elements, their wrinkles and sharp folds rub one against another, also furthering the forming of holes in the elements.

It is an object of the present invention to provide an option by means of which the wrinkling of the heat exchange element films is avoided during the expansion of the element. This prevents the forming of tears and holes in the element, and thereby lengthens its useful life. It is a further object of the invention to prevent the vertical and horizontal shrinking of the element in consequence to the expansion. The method for manufacturing the element according to the invention is characterized in that, during the manufacture, a permanent deformation is produced in the film forming the heat exchange surfaces of the element by stretching it between the bonding points, in order to provide leeway for the bulging upon the pressurization of the interior of the element.

The stretching is carried out according to the invention preferably by means of heat and a pressure differential between the different sides of the film. In the stretching it is thus possible to use suction acting on one side of the film or a pressurized gas, such as compressed air, pressing on the other side of the film, or suction and compressed air may act simultaneously on different sides of the film.

As a consequence of the permanent deformation caused in the film by the film stretching in accordance with the invention, during the pressurization of the interior of the element the film bulges into its stretched shape without a substantial additional stretching caused by the pressurization. In the stretching according to the invention, premolding the film, it is possible to use suitable mold pieces according to which the film yielding under the effect of heat is molded without wrinkling or folding. Thereafter the film can be expanded to its stretched shape smoothly, without wrinkling or tension peaks, and therefore the film will not tend to tear or become broken by friction. Furthermore, an element stretched in accordance with the invention has stable vertical and horizontal outer dimensions, which are not decreased during the expansion. Thereby movements in the orientation of the films of the element are avoided, as are problems in coupling the elements to dimensionally stable rigid feed and outlet duct systems for liquid and vapor.

According to one preferred embodiment of the invention, the films are brought against each other at their bonding points, whereafter the heat exchange film is stretched by directing pressure between the films, in areas between the bonding points, while the heat exchange film is heated. If hot gas, such as hot air, is used as the pressure medium, it causes both pressurization and the required heating of the film. However, the heating can also be carried out by other means, for example, by using a heating chamber, IR irradiation, or electric resistors. It is possible to use resistance heaters both for producing the deformation of the films and for bonding them.

Alternatively, the stretching of the heat exchange film can be carried out by means of heating and vacuum suction. The heating can be carried out, for example, by means of electric resistors, a heated roll, irradiation, or a hot gas or liquid. Especially preferably, a planar mold tool or a suction roll can be used, against the mold surface of which the film is sucked.

The simplest heat exchange element according to the invention is produced by bonding two oppositely positioned heat exchange films to each other. The bonding produces a bag-like element the interior of which is suitably divided into ducts by means of spot-like or linear, continuous or broken weld seams which form in the element straight or meandering vapor ducts.

Alternatively, a heat exchange element according to the invention can be formed, by bonding, from two heat exchange films and at least one support film positioned between them. The support film, which preferably consists of a plastic film stronger than the heat exchange films, increases the loadbearing capacity of the element as compared with an element made up of only heat exchange films. When the heat exchanger is used for evaporating suspensions which contain solid matter, or solutions which form a precipitate, there is left on the surfaces of the heat exchange films solid matter which increases the weight of the films and causes creep of the plastic material of the films. For this reason, up to now it has not been possible to make the heat exchange elements intended to such applications very high, the maximum dimension having been approx. 2–3 m. By contrast, the maximum dimension of an element reinforced with a support film according to the invention may be up to 10 m. At the same time, the heat exchange films can be made thinner than previously; this improves their heat exchange capacity. An element reinforced with a support film can also be strung tight so that its fluttering in the operating conditions is reduced. In an element equipped with a support film the heat exchange films are preferably plastic films having a thickness within a range of 10–100 µm, and a support film suitably thicker than they may be a plastic film having a thickness preferably within a range of 30 µm–1 mm.

A heat exchange element according to the invention can be reinforced not only by using a support film between the heat exchange films but also by using reinforcements of a fiber material, such as a glassfiber mat or net or a woven plastic fabric, bondable between the heat exchange films. Such a reinforcement may be, for example, integrated into a support film bonded between the heat exchange elements, or it may be placed as a reinforcement directly between the heat exchange films to be bonded to each other. The said reinforcements have the additional advantage of their low thermal expansion, in which case, owing to them, the heat exchange element retains its dimensions and remains taut in spite of a temperature increase.

A heat exchange element according to the invention for a film heat exchanger, which is intended for transferring heat from a pressurized vapor being condensed inside the element to a liquid being evaporated on the exterior surfaces of the element, and which is made up of oppositely positioned flexible plastic films bonded to each other at selected points in order to form ducts in the vapor space inside the element, is characterized in that the films which make up the heat exchange surfaces of the element have been stretched or crimped in the intervals between their bonding points in such a manner that the extensions produced in the films will provide leeway for bulging during the pressurization of the interior of the element.

Especially preferably the heat exchange element according to the invention is made up of two heat exchange films stretched or crimped between the bonding points and of at least one substantially straight support film positioned between them.

Figure 6:
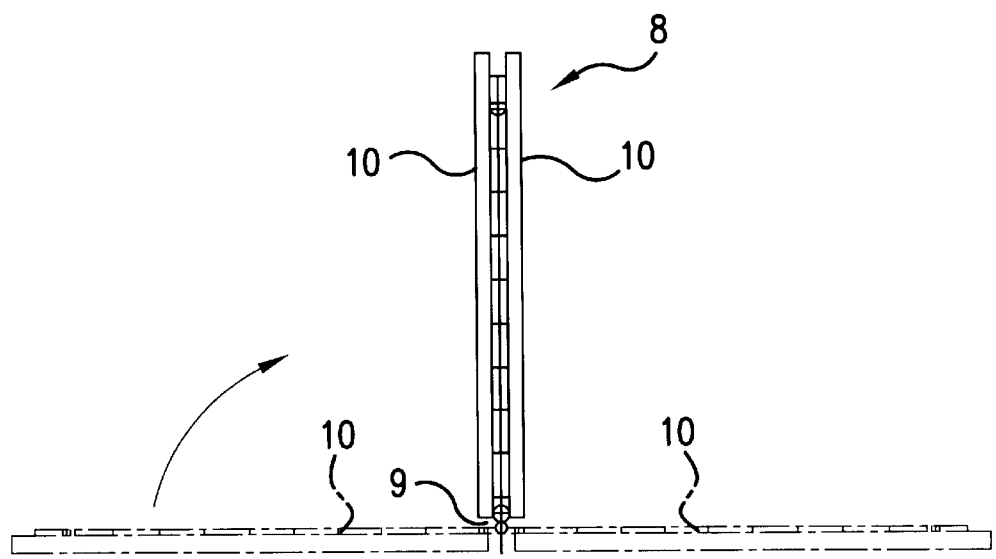
Figure 7:
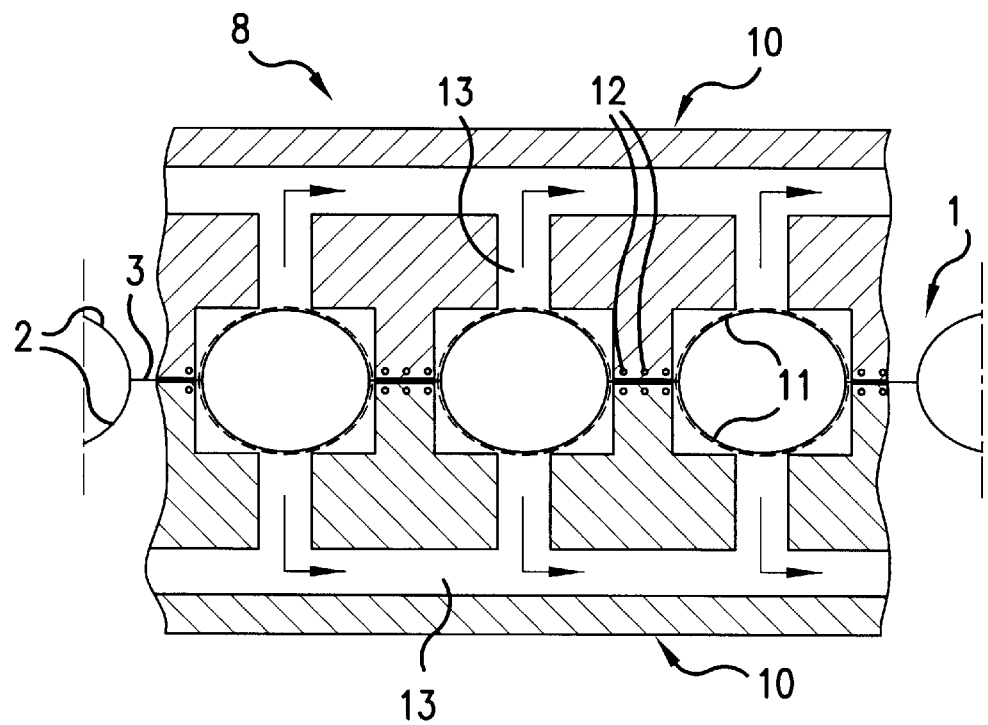
Figure 8:
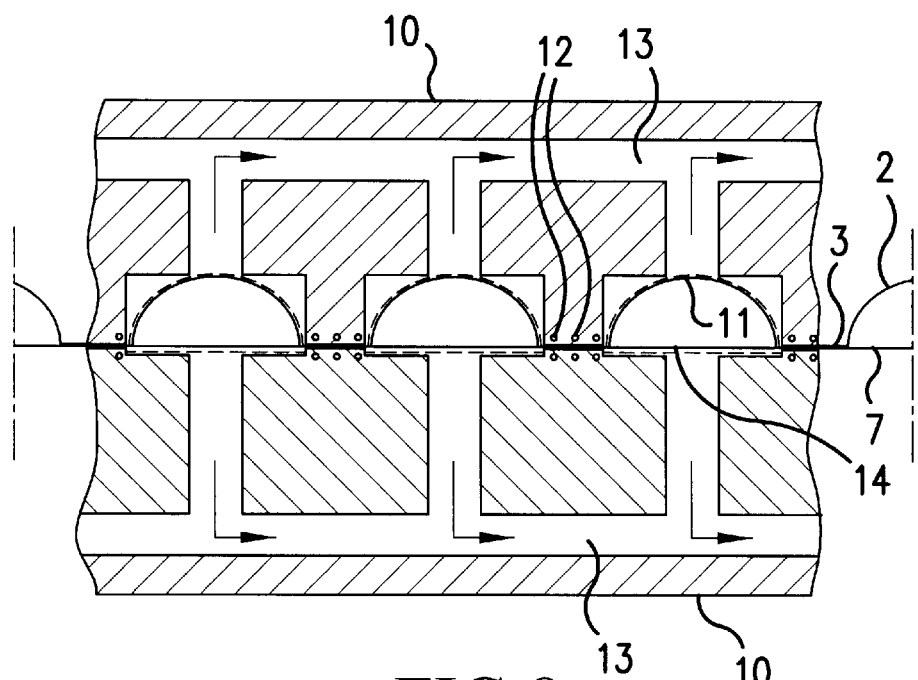
Figure 9:
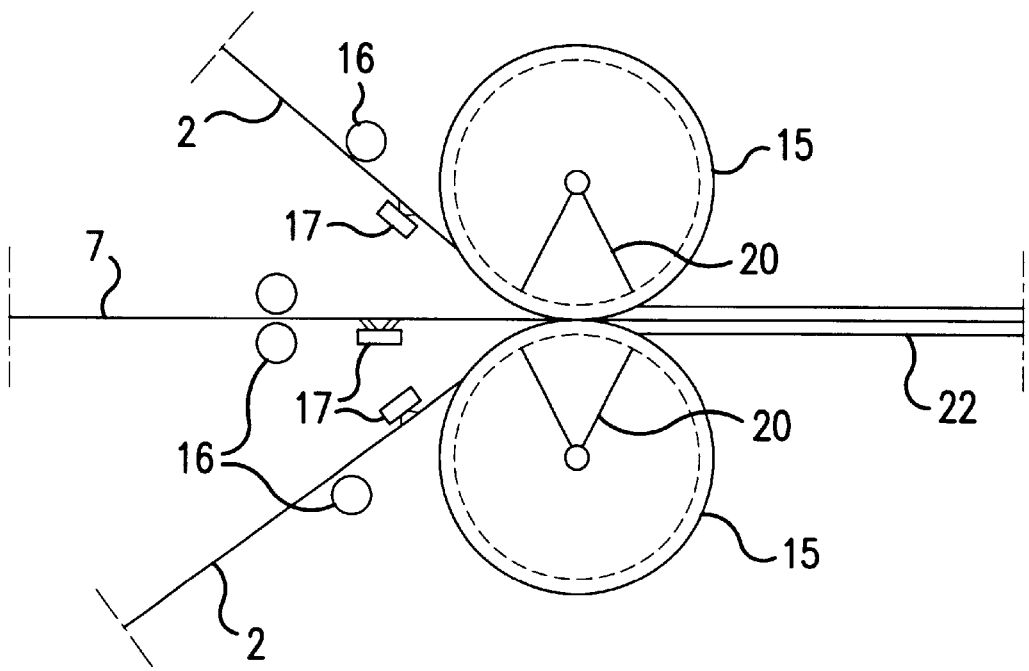
Figure 10:
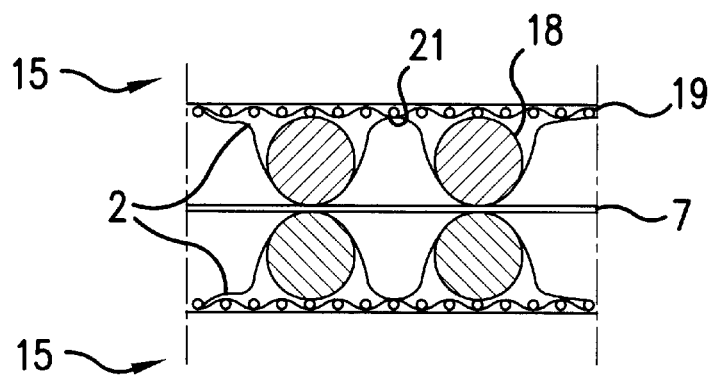

The invention is described below in greater detail with the help of examples, with reference to the accompanying drawings, in which FIG. 1 depicts a heat exchange element according to the invention for a film heat exchanger, FIG. 2 depicts a cross-section through II—II in FIG. 1 of an element made up of two oppositely positioned heat exchange films, the element being pressurized, FIG. 3 depicts, in a manner corresponding to FIG. 2, a cross-section of the element, the element being unpressurized, FIG. 4 depicts, in a manner corresponding to FIG. 2, a heat exchange element made up of two heat exchange films and a support film between them, FIG. 5 depicts a top view of a mold intended for the manufacture of a heat exchange element according to FIG. 1, the mold being open, FIG. 6 depicts the mold according to FIG. 5 as seen from the side, the mold being closed, FIG. 7 depicts on a larger scale a section of a part of a closed mold according to FIG. 6, the heat exchange films of an element being manufactured being stretched therein by means of suction, FIG. 8 depicts, in a manner corresponding to FIG. 7, the bonding of a heat exchange film and a support film and the stretching of the heat exchange film between two mold pieces equipped with suction ducts, as part of the manufacture of a heat exchange element according to the invention, provided with support films, FIG. 9 depicts the bonding of two heat exchange films and a support film to be positioned between them, between a pair of suction rolls, as part of the manufacturing process of a heat exchange element according to the invention, and FIG. 10 depicts a section, on a larger scale, of the bonding of the films according to FIG. 9.

An individual heat exchange element 1 according to FIG. 1 for a film heat exchanger is made up of two oppositely positioned plastic heat exchange films 2, which attach to each other at the top and the bottom of the element and on the side which is on the left in the figure. The films 2 are additionally bonded to each other along mutually parallel oblique bonding lines 3, which divide the interior of the element into parallel ducts 4 extending from one side of the element to the other. The hot vapor to be condensed is introduced into the interior of the element from its at least partly open side 5, which is on the right in the figure, in accordance with the arrows in the figure, and the condensate formed from the vapor in the ducts 4 leaves via the outlet opening 6 in the lower left corner of the element.

A film heat exchanger which is used, for example, for the evaporation of a suspension or a solution or for the distillation of a liquid may comprise a large number of vertically oriented heat exchange elements 1 positioned one against another, of which every section may be in a position reversed with respect to FIG. 1 so that the ducts 4 inside the elements will tilt alternately in opposite directions. This ensures that the liquid to be evaporated, directed between the elements 1, is evenly distributed over the exterior surfaces of the heat exchange films 2 of the elements.

An essential characteristic of the heat exchange element 1 according to the present invention is the stretching of the heat exchange films 2 in the intervals between the bonding lines 3, i.e. in the area of the vapor ducts 4, in order to provide leeway for bulging when the element is pressurized. FIG. 2 is a cross-section of an element 1 bulged by the hot, pressurized vapor which is fed in, the films 2 premolded by stretching being outwardly bulged in the intervals between the bonding lines 3 and the vapor ducts 4 being at their maximum volume. The same element 1 is seen in the unpressurized state in FIG. 3. By the stretching of the heat exchange films 2 at the manufacturing stage of the element 1 the bulging leeway is provided in advance in the element and the bulging will take place evenly, without wrinkling or folding the films, so that no sharp rubbing points or tension peaks which would in practice lead to premature breaking of the films are formed in the films during pressurization.

FIG. 4 depicts another embodiment of the invention, wherein between the oppositely positioned heat exchange films 2 of the heat exchange element 1 there is bonded a support film 7 thicker than they. The support film 7 divides the interior of the element 1 so that the element has expandable vapor ducts 4 on both sides of the support film. In other respects the structure and operation of the element 1 correspond to that presented above. By a support film 7 it is possible to improve the capacity of the element to bear the solid matter left on its exterior surfaces during evaporation so that the height of the element can be increased. At the same time the heat exchange films 2 can be made thinner, since the loadbearing capacity of the element is no longer dependent on them. It order to reinforce the element further and to avoid thermal expansion, it is possible to incorporate into the support film 7 reinforcement fibers, for example, in the form of a glassfiber or kevlar mat or net (not shown) integrated into the film.

FIGS. 5–7 show schematically one apparatus for the manufacture of the heat exchange element 1 according to FIGS. 1–3. FIG. 5 shows an opened manufacturing mold 8 as seen from the top, and the closing of the mold can be seen in FIG. 6, which shows the mold 8 as seen from the side. The mold 8 is made up of two mold pieces 10 hinged to each other at their ends 9, which pieces can be turned against each other in order to stretch and bond the films placed between them.

The structure of the mold pieces 10 and the stretching and bonding, between them, of the heat exchange films 2 to form a heat exchange element 1 are shown in greater detail in FIG. 7. The mold pieces 10 are equipped with parallel, curved support surfaces 11 made of netting and extending obliquely across the mold pieces, and with heating resistors 12 between them. The rear sides of the support surfaces 11 are connected to a vacuum duct system 13 in order to produce vacuum suction. The heat exchange films 2 which form the element 1, and which have been placed on the mold pieces 10 while the mold 8 is open, remain between the mold pieces turned against each other and are heat sealed to each other at the bonding lines 3 formed by the heating resistors 2. The vacuum suction generated in the intervals between the bonding points 3 via the duct system 13 stretches the films 2 against the perforated support surfaces 11 while heat effective inside the mold 8 deforms the films so that the stretching produced in them will be permanent. The element 1 is thus molded between the mold pieces 10 into a shape which it will have in use when the interior of the element is bulged by pressurized vapor, cf. FIG. 2.

The film heating required for the deformation of the heat exchange films 2 may be carried out, for example, by irradiation before the closing of the mold 8 or by carrying out the entire molding process in a heating chamber. It is also possible to use hot air blown between the films 2; when pressurized sufficiently the hot air may promote the stretching of the films against the support surfaces 11 of the mold pieces. According to one embodiment of the invention, the stretching of the films 2 can indeed be carried by means of pressurized air blowing alone, in which case the suction duct systems 13 of the mold are unnecessary and may be omitted.

FIG. 8 relates to the manufacturing process of a heat exchange element which is made up of two heat exchange films 2 and of two support films 7 between them. The manufacture is carried out by first attaching each of the heat exchange films 2 separately to the support film 7 coming against it and by thereafter bonding to each other the film pairs thus obtained.

FIG. 8 depicts the first stretching and bonding step of the said process, wherein a heat exchange film 2 and a support film 7 are bonded to each other between two oppositely positioned mold pieces 10. One of the mold pieces 10 is equipped with curved support surfaces 11 made of netting, against which the heat exchange film 2 is stretched by means of vacuum suction generated via a duct system 13. The opposite mold piece 10 has support surfaces 14, also of net sheet, and a vacuum duct system 13, but in a manner deviating from the foregoing the support surfaces 14 are straight, in which case the vacuum suction only keeps the support film 7 in place without subjecting it to stretching. In the intervals between the support surfaces 11, 14 the mold pieces 10 have heating resistors 12 for bonding the heat exchange film 2 and the support film 7 to each other along the bonding lines 3 formed by the resistors. In FIG. 8, in which the mold pieces 10 are against each other, the heat exchange film 2 is stretched into its final shape, which corresponds to the bulging of the film by pressurized vapor during use, and bonded to a support film 7 which has not been subjected to deformation.

The bonding together of the film pairs produced in accordance with FIG. 8, made up of heat exchange and support films 2, 7, to form a heat exchange element made up of two heat exchange films 2 and two support films 7 between them may be carried out by bringing the film pairs, each in a separate mold piece 10, opposite each other and by bonding the film pairs together by means of the heating resistors 12 in the mold pieces.

In the embodiment of the invention shown in FIGS. 9 and 10, the stretching and bonding step of the process of manufacturing a heat exchange element made up of two heat exchange films 2 and one support film 7 between them is carried out by directing the films 2, 7 between two oppositely positioned suction rolls 15. Before coming between the rolls 15 the films 2,7 are heated by means of heating rolls 16 and irradiators 17. The surfaces of rolls 15 are profiled by means of metal wires 18 positioned on them in a manner corresponding to the bonding lines of the element to be manufactured, there being a permeable metal net 19 under the wires. The suction stretching the heat exchange films 2 is effective in each roll 15 within a sector 20 separated in the area of the roll nip from the interior of the roll and within which vacuum prevails. The suction draws the heated heat exchange films 2, while stretching them, into the recesses 21 between the metal wires 18 projecting from the surfaces of the rolls, while the thicker support film 7 remains straight between the rolls, as can be seen in FIG. 10. At the same time the hot films 2, 7 are pressed and bonded to each other between the metal wires 18 projecting from the oppositely positioned rolls 15.

The process according FIGS. 9 and 10 for the stretching and bonding of the films 2, 7 produces a continuous bonded film web 22, which is thereafter cut into separate heat exchange elements 1. By the process it is possible to produce an element according to FIG. 1, the interior of which is divided by bonding into parallel ducts running obliquely across the element. However, it is equally possible to form in the web suitably zigzagging bonding lines in the longitudinal orientation of the web, in which case the heat exchange element obtained will have meandering ducts leading downwardly from the top in a vertical direction. If the circumference of the roll corresponds to the length or width of the element manufactured, or is a multiple thereof, the surfaces of the rolls can be preferably profiled to produce at one time all the seams required in the element, i.e. both the side and end seams of the element and the bonding lines delimiting the ducts in accordance with the specifications of the element, in which case the element can be obtained from the bonded web simply by being cut out along its outline.

For a person skilled in the art it is evident that the various embodiments of the invention are not limited to those presented above by way of example, but may vary within the accompanying claims. Thus it is not necessary that the bonding lines of the element and the ducts delimited by them are straight and continuous; the bonding lines may be broken and/or meandering or be made up of separate, point-like bonding points or of combinations of these bonding patterns. In all cases, the stretching, in accordance with the invention, of the heat exchange film in the intervals between the bonding points in the element manufacturing phase will provide a premolded heat exchange element which can be bulged without wrinkles and folds which would cause tension peaks or abrasion.

What is claimed is:

1. A heat exchange element for a film heat exchanger, which transfers heat from pressurized vapor being condensed inside the element to a liquid being evaporated on the exterior surfaces of the element, and which is made up of oppositely positioned flexible plastic films which are bonded one to another at selected points in order to divide the vapor space inside the element into ducts, wherein the films which form the heat exchange surfaces of the element have been stretched or crimped in the intervals between their bonding points so to produce extensions in the films which serve as leeway for bulging during the pressurization of the interior of the element, the element having stable vertical and horizontal outer dimensions at the pressurization and the bulging expansion occurring transversally to said stable dimensions.

2. The heat exchange element according to claim 1, wherein the substantially bag-like element is made up of two oppositely positioned heat exchange films bonded to each other.

3. The heat exchange element according to claim 1, wherein the element is made up of two heat exchange films stretched or crimped in the intervals between their bonding points and of at least one substantially straight support film between them.

4. The heat exchange element according to any one of claims 1–3, wherein the element comprises reinforcement fibers bonded between the heat exchange films.

5. The method according to claim 4, wherein said bonded reinforcement fibers selected from the group consisting of glassfiber mat and glassfiber net.

6. A heat exchange element comprising a pair of flexible plastic films positioned opposite to each other and bonded to each other selectively to divide the interior space between the films into ducts defined by the bonds, the films having permanent deformations between the bonds produced by stretching of the films so that the element is expandable by pressurizing the interior ducts, the element having stable vertical and horizontal dimensions and the expansion occurring transversally to said stable dimensions.

7. A method for manufacturing a heat exchange element for a film heat exchanger, wherein an element intended for a heat exchanger which transfers heat from a pressurized vapor being condensed inside the elements to a liquid being evaporated on the exterior surfaces of the elements is formed from oppositely positioned plastic films, which are bonded at selected points one to another in order to divide the interior of the element into ducts, wherein in connection with the manufacture, a permanent deformation is produced in the film constituting the heat exchange surfaces of the element, by stretching it in the intervals between its bonding points, in order to provide leeway for bulging during the pressurization of the interior of the element, wherein the heat exchange element is formed, by bonding, from two heat exchange films and at least one support film positioned between them, and wherein the heat exchange films are plastic films having a thickness within a range of 10–100 $\mu$m, and that the support film, thicker than they, is a plastic film having a thickness within a range of 30 $\mu$m–1 mm.

8. A method for manufacturing a heat exchange element for a film heat exchanger, wherein an element intended for a heat exchanger which transfers heat from a pressurized vapor being condensed inside the elements to a liquid being evaporated on the exterior surfaces of the elements is formed from oppositely positioned plastic films, which are bonded at selected points one to another in order to divide the interior of the element into ducts, wherein, in connection with the manufacture, a permanent deformation is produced in the film constituting the heat exchange surfaces of the element, by stretching it in the intervals between its bonding points, in order to provide leeway for bulging during the pressurization of the interior of the element, the element having stable vertical and horizontal outer dimensions at the pressurization and the bulging expansion occurring transversally to said stable dimensions.

9. The method according to claim 8, wherein the stretching of the film is carried out by means of heat and a pressure differential between the different sides of the film.

10. The method according to claim 9, wherein the films are positioned against each other at their bonding points, whereafter the heat exchange film is stretched by directing pressure between the films in the areas between the bonding points, while the heat exchange film is heated.

11. The method according to claim 10, wherein the space between the films is pressurized by means of hot gas.

12. The method according to claim 9, wherein the heat exchange film is heated and stretched in the desired areas by subjecting these areas to vacuum suction.

13. The method according to claim 12, wherein the stretching and bonding of the films is carried out by directing the films between two oppositely positioned suction rolls, the surfaces of the rolls being equipped with projections corresponding to the bonding points of the films so that the films will stretch as they are sucked into recesses between the projections while the bonding takes place as the projections press the heated films one against another.

14. The method according to claim 8, wherein a substantially bag-like heat exchange element is manufactured by bonding two oppositely positioned heat exchange films to each other.

15. The method according to claim 8, wherein the heat exchange element is formed, by bonding, from two heat exchange films and at least one support film positioned between them.

16. The method according to claim 8, wherein between the heat exchange films there are bonded reinforcement fibers.

17. The method according to claim 16, wherein said bonded reinforcement fibers are selected from the group consisting of glassfiber mat and glassfiber net.

18. A method for the exchange of heat, comprising the steps of:
  (i) providing a heat exchange element by bonding two oppositely positioned flexible plastic films to divide the interior between the films into ducts, and stretching the films at areas between the bonds to produce permanent deformation of the films, and
  (ii) bringing the element into use for heat exchange comprising pressurizing the interior ducts of the element to bulge them, the previous deformation providing leeway for a bulging expansion, the element having stable vertical and horizontal dimensions at the pressurization and the bulging expansion occurring transversally to said stable dimensions.

* * * * *